United States Patent [19]

Hendriks et al.

[11] Patent Number: 5,632,860

[45] Date of Patent: May 27, 1997

[54] METHOD OF CONTROLLING FOAM IN AQUEOUS SYSTEMS

[75] Inventors: William A. Hendriks; Daniel J. Barnett, both of Jacksonville, Fla.

[73] Assignee: BetzDearborn Inc., Trevose, Pa.

[21] Appl. No.: 498,326

[22] Filed: Jul. 5, 1995

[51] Int. Cl.$^6$ .................... D21H 21/12; D21H 17/06; B01D 19/04

[52] U.S. Cl. .................... 162/177; 162/173; 162/158; 162/76; 162/77

[58] Field of Search .................... 162/173, 158, 162/177, 72, 76, 77; 252/321, 328

[56] References Cited

U.S. PATENT DOCUMENTS

| | | | |
|---|---|---|---|
| 3,549,539 | 12/1970 | Mallows | 252/358 |
| 3,637,869 | 1/1972 | Seizinger | 260/615 B |
| 3,829,506 | 8/1974 | Schmolka et al. | 252/321 |
| 4,076,648 | 2/1978 | Rosen | 252/358 |
| 4,229,547 | 10/1980 | Cohen et al. | 521/69 |
| 4,477,371 | 10/1984 | Huber et al. | 252/358 |
| 4,950,420 | 8/1990 | Svarz | 252/321 |
| 4,968,448 | 11/1990 | Svarz | 252/358 |
| 5,229,033 | 7/1993 | Nguyen et al. | 252/358 |
| 5,283,002 | 2/1994 | Nguyen | 252/321 |
| 5,320,777 | 6/1994 | Nguyen et al. | 252/358 |
| 5,425,899 | 6/1995 | Nguyen et al. | 252/321 |

FOREIGN PATENT DOCUMENTS

| | | |
|---|---|---|
| 0537018 | 4/1993 | European Pat. Off. . |
| 1557086 | 1/1969 | France . |
| 6816513 | 3/1968 | Japan . |
| 91/00764 | 1/1991 | WIPO ................. 252/321 |
| 94/16044 | 7/1994 | WIPO ................. 252/321 |

OTHER PUBLICATIONS

Ser. No. 08/233603 Hendriks Apr. 19, 1994.

Primary Examiner—Donald E. Czaja
Assistant Examiner—Jose A. Fortuna
Attorney, Agent, or Firm—Alexander D. Ricci; Richard A. Paikoff

[57] ABSTRACT

A method for controlling foam in the papermaking operation comprising a polyether surfactant and polyethoxylated sorbitol hexaoleate.

6 Claims, 1 Drawing Sheet

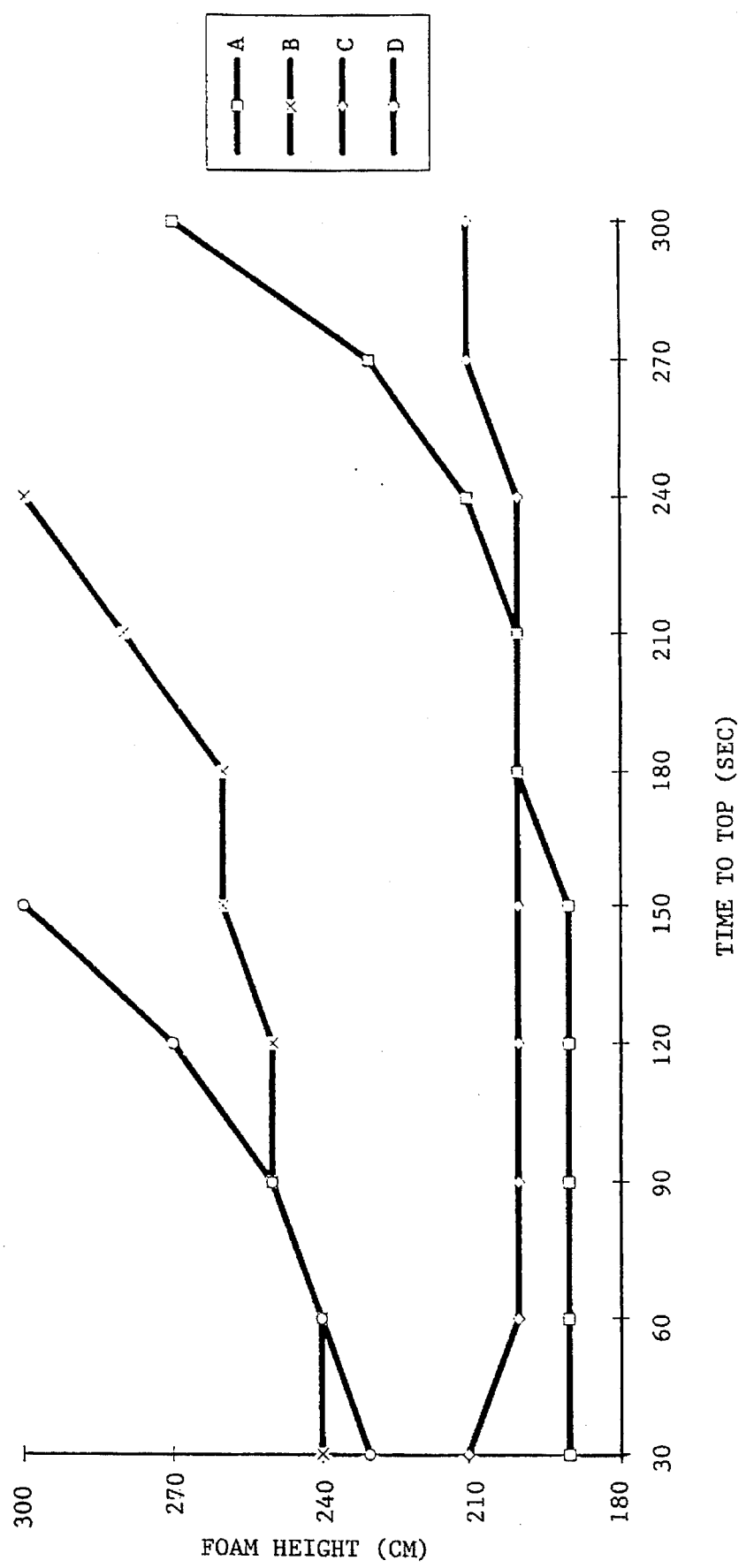
FIGURE I

METHOD OF CONTROLLING FOAM IN AQUEOUS SYSTEMS

FIELD OF THE INVENTION

The present invention relates to foam control compositions, their preparation and use in aqueous systems. This composition for foam control is particularly effective in the pulp and paper manufacturing process and treatment of effluent where there is a need to control surface foam and entrained air at elevated temperatures.

BACKGROUND OF THE INVENTION

Mechanical actions and chemical reactions both help to create and stabilize foam in papermaking and effluent systems, particularly where elevated temperatures are concerned. In the papermaking process, inadequate foam control can cause loss of production through reduced machine speeds, caused by diminished drainage and reduced drying efficiency, as well as lower product quality caused by poor sheet formation. The efficiency of effluent systems is greatly reduced when control of foam in the system is lost.

It is widely known that foam is a colloidal system in which a gas is dispersed in a liquid. This foam can exist as bubbles of gas entrained in the bulk of the liquid medium or as a combination of entrained gas and visual foam on the surface of the liquid. Both the surface foam and trained gas contribute to reducing production efficiency.

The pumping of liquids through pipes, strainers, refiners and other types of processing equipment can create foam mechanically. Foam can be stabilized by salts of rosin acids, fatty acids, and lignins that absorb at the air/liquid interface. Finely divided particles such as starch, cellulose, and fillers also contribute to the stabilization of foam. Defoamers are added to the foaming medium in order to prevent foam formation or cause collapse of existing foam. The collapse of the foam is accomplished by dewetting the surface by a hydrophobic particle which enters the air/liquid interface in the lamella of the bubble. Due to capillary forces, the lamella drains sufficiently on both sides, causing a weak point or hole in the film, which leads to rupture of the lamella.

Most conventional defoamers are comprised of a hydrophobic material such as a saturated long chain fatty acid or fatty alcohol having a melting point greater than about 105° F., or an insoluble hydrophobically modified particle, such as silica dispersed in an oil phase. These products generally use hydrocarbon oil as a carrier and can be diluted with water. Some products can be produced as 100% water-based emulsions. These compositions generally require extensive processing such as heating, cooling, and homogenization. These compositions also tend to quickly become unstable over short periods of time.

Conventional defoamer/antifoam compositions include ethylene (bis) stearamide (EBS), fatty alcohol, fatty acid or hydrophobic silica. Problems result from the use of these products because they are particulate and will aggravate deposition. Additionally, some defoamer/antifoam products may include a hydrocarbon oil carrier. Such products are known to negatively effect paper sheet properties, such as brightness and sizing.

These and other problems associated with the use of conventional defoamer/antifoams in the wet end of a papermaking operation, which is basically the fiber slurry (commonly known as white water) from which the sheet of paper is made, are resolved by the present invention.

It is an object of the present invention to provide an improved foam control composition for elevated temperatures in the pulp and papermaking process. It is a further object of the present invention to eliminate the necessity of heating, cooling and/or homogenizing with respect to processing. It is also an object of the present invention to produce a stable foam control composition. The foam control composition comprises a polyether surfactant and a polyethoxylated sorbitol hexaoleate. This composition is a concentrated, dispersible product containing no hydrocarbon oil, water or particulate and can be processed by blending at ambient temperatures. The combination of ingredients of the present invention produces a composition which is stable at least for three months at storage temperatures ranging from 40° F. to 140° F. The foam control composition is added to aqueous systems but is particularly effective in controlling foam generated in papermaking operations at elevated temperatures of 120° F. and above.

SUMMARY OF THE INVENTION

Applicants have discovered that a composition comprising a polyether surfactant and a polyethoxylated sorbitol hexaoleate performs highly effectively as a defoamer/antifoam in the effluent of a papermaking operation. Dipropylene glycol may be optionally admixed with the above combination without significant loss in performance.

The compositions of the present invention contain no hydrocarbon oil carrier, which is widely known to effect sheet properties, such as brightness and sizing. The compositions contain no particulate-type active ingredients, i.e., ethylene(bis)stearamide (EBS), fatty alcohol, fatty acid or hydrophobically modified silica. These particulate actives in conjunction with oil are commonly known to aggravate deposition on the paper machine.

BRIEF DESCRIPTION OF THE DRAWINGS

FIG. 1 is a graph of foam height (in centimeters) versus time to top (in seconds) of various products, as described below.

DETAILED DESCRIPTION OF THE INVENTION

The polyether surfactant is derived from the propoxylation of propylene glycol followed by ethoxylation. The resulting product is an ethylene oxide/propylene oxide (EO/PO) block copolymer having an HLB in the range of 0.1–5, preferably 1–3. Its molecular weight is in the range of about 1000–4500. Such products are commercially available from BASF under the Pluronic® tradename.

The polyethoxylated sorbitol hexaoleate contains about 30 to 60 moles of ethylene oxide. Its HLB is in the range of 9–12 and its molecular weight is between about 3000 and 5000. It is commercially available from either Henkel under the Trylox tradename or ICI under the Atlas® tradename.

In making the defoamer/antifoam agent, from about 10–90%, by weight, of the polyether surfactant is added to about 10–50%, by weight, of the polyethoxylated sorbitol hexaoleate. The preferred ranges are: about 60–80%, by weight, of polyether surfactant and about 20–40%, by weight, of the polyethoxylated sorbitol hexaoleate.

The formulated defoamer/antifoam agent may be added to the aqueous medium in a concentration ranging from about 1.0 to 500 ppm, by weight. Preferably, the concentration ranges from about 10 to 100 ppm.

EXAMPLES

To illustrate the efficacy of the invention, a variety of pulp and paper processing waters are used as foaming media. The antifoams according to the invention can be used in aqueous paper processing foaming systems and are particularly effective at elevated temperatures of 120° F. and above with temperatures of from about 120° to 180° F. being preferred.

Example 1

| Product A | Product B |
|---|---|
| Organic esters/ethoxylated surfactants | Polyether/polyoxyethylene sorbitol hexaoleate concentrate of the present invention |

The composition of the present invention was tested versus commercially available materials in a paper mill that produced 500–600 tons per day (TPD) of linerboard, tube stock, and medium from 100% recycled fiber at a temperature of 160° F. and a pH of 7.4. Table I shows the effects of the products on entrained air using an entrained gas tester (EGT) at equal feed rates of 40 cc/min. to the paper machine over an extended period of time.

TABLE I

ENTRAINED AIR STUDY (EGT)

| Time (hours) | Product | Base Headbox | Top Headbox | Basis Weight (lbs) |
|---|---|---|---|---|
| 0 | A | 4.2% | 3.7% | 26 |
| 1 | A | 4.2% | 3.5% | 26 |
| 2 | B | 2.5% | 1.6% | 26 |
| 3 | B | 1.9% | 1.5% | 26 |
| 4 | B | 1.8% | 1.3% | 26 |

Table I shows that the composition of the present invention (Product B) reduced entrained air in the base headbox by 54–56% and in the top headbox by 54–62% upon equilibrium. Table II below shows the results of drainage testing using a standard drainage tube on samples taken at the headboxes.

TABLE II

DRAINAGE TUBE STUDY

| Sample Location | Product A | Product B | % Drainage Improvement |
|---|---|---|---|
| Base Headbox | 19 seconds | 16 seconds | +15.8 |
| Top Headbox | 10 seconds | 8 seconds | +20.0 |

As shown in Table II, the composition of the present invention (Product B) increased drainage of both the top and bottom headboxes. This increase in drainage allowed the mill to increase machine speed, thus increasing production. Production was increased from 540.0 TPD to 598.7 TPD, an increase of 10.8%, and average TPD rose from 412.1 to 421.5, an increase of 2.3%.

Example 2

The following products were tested at a coated liner board mill using a recirculating test cell. The foaming medium is circulated from the bottom of the reservoir with a calibrated overflow column (0–300 cm) via a pump, and is returned to the reservoir down through the overflow column. This action agitates the medium and causes foam which flows up the calibrated tube, allowing one to determine the foam height in the column at specific time intervals. The reservoir is wrapped with heat tape and is kept at a constant temperature via a probe and temperature controller. The foam column heights are then recorded every 30 seconds until the foam reaches the top at the 300 cm mark. The longer the time for the medium to reach the top of the column indicates better performance. The temperature of the stock tested at the base headbox was 155° F. and the pH of the system was 5.5.

Product A—Commercially available oil/ethylene (bis) stearamide (EBS)/water emulsion.

Product B—Commercially available polybutene/surfactant concentrate (see U.S. Patent 5,229,033).

Product C—Polyether/polyoxyethylene sorbitol hexaoleate concentrate of the present invention.

Product D—Commercially available polybutene/surfactant concentrate (see U.S. Pat. No. 5,229,033).

The products were all tested on an equal actives basis. As shown in FIG. 1, Product C of the present invention displays improved performance over the other types of products tested.

Example 3

The following products were compared in a thermomechanical pulp (TMP) mill:

Product A—Commercially available microemulsion containing fatty acids, fatty ester, alcohol and water.

Product B—Polyether/polyoxyethylene sorbitol hexaoleate concentrate of the present invention.

The TMP mill produces approximately 170 TPD and runs at a temperature of 180° F. and a pH of 5.0. The primary measurements for comparison were to maintain pressure across the primary, secondary and tertiary cleaner and maintain decker chest consistencies between 4.4–4.5%, and no lower than 4.3%. The feed rate of Product A had been optimized at 92 cc/min. Product B of the present invention was able to maintain pressure across the cleaners as well as maintain decker chest consistency, while reducing the feed rate from 45 cc/min. to 10 cc/min., indicating improved performance.

Example 4

The following products were compared in a mill producing medium grade brown paper from 100% recycled paper:

Product A—Commercially available oil-based/organic salt/ethoxylated surfactant antifoam.

Product B—Polyether/polyoxyethylene sorbitol hexaoleate concentrate of the present invention.

The mill operates the machine at 120° F. and a pH of 7.0. It can be seen from Table III that product B of the present invention outperformed product A by reducing the amount of entrained air, as measured by the EGT, at substantially reduced feed rates.

TABLE III

| Day | Time (hours) | Defoamer | Feed Rate | EGT % |
|---|---|---|---|---|
| 1 | 0 | A | 294 cc/min. | 7.25 |
|   | 1.5 | A | 287 cc/min. | 7.56 |
|   | 3.5 | A | 271 cc/min. | 7.56 |
|   | 5.5 | A | 480 cc/min. | 8.18 |
|   | 6.5 | A | 369 cc/min. | 7.25 |
|   | 7.6 | A | 363 cc/min. | 7.56 |
| 2 | 0 | A | 265 cc/min. | 8.18 |
|   | 2 | B | 67 cc/min. | — |
|   | 3 | B | 67 cc/min. | 5.70 |
|   | 4 | B | 70 cc/min. | 6.32 |

TABLE III-continued

| Day | Time (hours) | Defoamer | Feed Rate | EGT % |
|---|---|---|---|---|
| | 5 | B | 70 cc/min. | — |
| | 7 | B | 24 cc/min. | 6.94 |
| | 8 | B | 23 cc/min. | — |
| | 9 | B | 23 cc/min. | 6.94 |

—: No reading at this time.

While this invention has been described with respect to particular embodiments thereof, it is apparent that numerous other forms and modifications fications of this invention will be obvious to those skilled in the art. The appended claims and this invention generally should be construed to cover all such obvious forms and modifications which are within the true spirit and scope of the present invention.

We claim:

1. A process for controlling foam in the wet end of a papermaking system at temperatures above about 120° F. consisting essentially of adding to the system a sufficient amount for the purpose of a defoaming agent of from about 10–90%, by weight, of a polyether surfactant and from about 10–50%, by weight, of a polyethoxylated sorbitol hexaoleate.

2. The process as recited in claim 1 wherein the polyether surfactant is an ethylene oxide/propylene oxide block copolymer having an HLB in the range of 0.1–5 and a molecular weight range between about 1000 and 4500.

3. The process as recited in claim 1 wherein the polyethoxylated sorbitol hexaoleate contains about 30 to 60 moles of ethylene oxide, has an HLB in the range of 9–12 and a molecular weight between about 3000 and 5000.

4. The process as recited in claim 1 wherein approximately 1.0 to 500 ppm, by weight, of the defoaming agent is added to the system.

5. The process as recited in claim 1 wherein said defoaming agent is added to a fiber slurry in said papermaking system.

6. The process as recited in claim 1 wherein the temperature is from about 120° to 180° F.

\* \* \* \* \*